US010059533B2

(12) United States Patent
Wigren et al.

(10) Patent No.: US 10,059,533 B2
(45) Date of Patent: Aug. 28, 2018

(54) CONTROLLING A VACUUM SYSTEM COMPRISING A VACUUM GENERATOR

(71) Applicant: Xerex AB, Taby (SE)

(72) Inventors: Gustaf Wigren, Vaxholm (SE); Peter Engborg, Skogas (SE)

(73) Assignee: Piab Aktiebolag, Täby (SE)

( * ) Notice: Subject to any disclaimer, the term of this patent is extended or adjusted under 35 U.S.C. 154(b) by 0 days.

(21) Appl. No.: 15/404,766

(22) Filed: Jan. 12, 2017

(65) Prior Publication Data

US 2017/0203929 A1    Jul. 20, 2017

(30) Foreign Application Priority Data

Jan. 15, 2016    (EP) .................................... 16151553

(51) Int. Cl.
  *B65G 47/91*    (2006.01)
  *B66C 1/02*    (2006.01)
  *B25J 15/06*    (2006.01)

(52) U.S. Cl.
  CPC ........ *B65G 47/917* (2013.01); *B25J 15/0625* (2013.01); *B66C 1/0256* (2013.01); *B66C 1/02* (2013.01)

(58) Field of Classification Search
  CPC .. B25J 15/0616; B25J 15/065; B25J 15/0658; B25J 15/0675; B25J 15/0625; B66C 1/0256; B66C 1/0268; B65G 47/917
  (Continued)

(56) References Cited

U.S. PATENT DOCUMENTS 4,750,768 A * 6/1988 Kumar .................. B66C 1/0212
                                                          294/185
5,188,411 A    2/1993 Golden
(Continued)

FOREIGN PATENT DOCUMENTS

DE    100 09 167 A1    9/2001
EP    2 080 913 A1    7/2009
(Continued)

OTHER PUBLICATIONS

Extended European Search Report for corresponding European Patent Application No. 16151553.1 dated Jun. 28, 2016.

*Primary Examiner* — Dean J Kramer
(74) *Attorney, Agent, or Firm* — Renner, Otto, Boisselle & Sklar, LLP

(57) ABSTRACT

A controller for controlling a vacuum generator in a vacuum system for transportation of objects, which vacuum system comprises a vacuum generator driven by a compressed air flow via a first on/off valve, to supply vacuum to a vacuum gripper, the vacuum system comprises a second valve arranged to supply compressed air into the vacuum system; a pressure sensor for monitoring a system-pressure inside a vacuum chamber; and the controller that is arranged to communicate with the first on/off valve, the second valve and the pressure sensor; and when the on/off valve is not flowing air to the vacuum generator, and the controller indicates a state of no vacuum generation, and if a fluctuation from a pressure-equilibrium to a negative time-derivative of the system-pressure is detected, the controller is arranged to activate the second valve, allowing compressed air to flow into the vacuum-chamber for compensation to re-establish the pressure-equilibrium.

16 Claims, 1 Drawing Sheet

(58) Field of Classification Search
USPC .................................... 294/183, 185, 186
See application file for complete search history.

(56) References Cited

U.S. PATENT DOCUMENTS

| | | | |
|---|---|---|---|
| 5,617,338 A * | 4/1997 | Sugano | B65G 47/917 340/626 |
| 5,629,207 A * | 5/1997 | Seto | G01N 35/00029 279/3 |
| 6,416,295 B1 | 7/2002 | Nagai et al. | |
| 6,443,175 B1 | 9/2002 | Pabst | |
| 6,786,228 B2 * | 9/2004 | Pabst | F04F 5/52 137/14 |
| 7,950,422 B2 | 5/2011 | Perlman et al. | |
| 8,096,598 B2 * | 1/2012 | Perlman | B25B 11/007 294/64.2 |
| 8,678,776 B2 * | 3/2014 | Medow | F04F 5/52 417/151 |

FOREIGN PATENT DOCUMENTS

| | | |
|---|---|---|
| EP | 1 064 464 A2 | 9/2013 |
| EP | 2 263 011 B1 | 9/2013 |
| WO | 99/49216 | 9/1999 |

\* cited by examiner

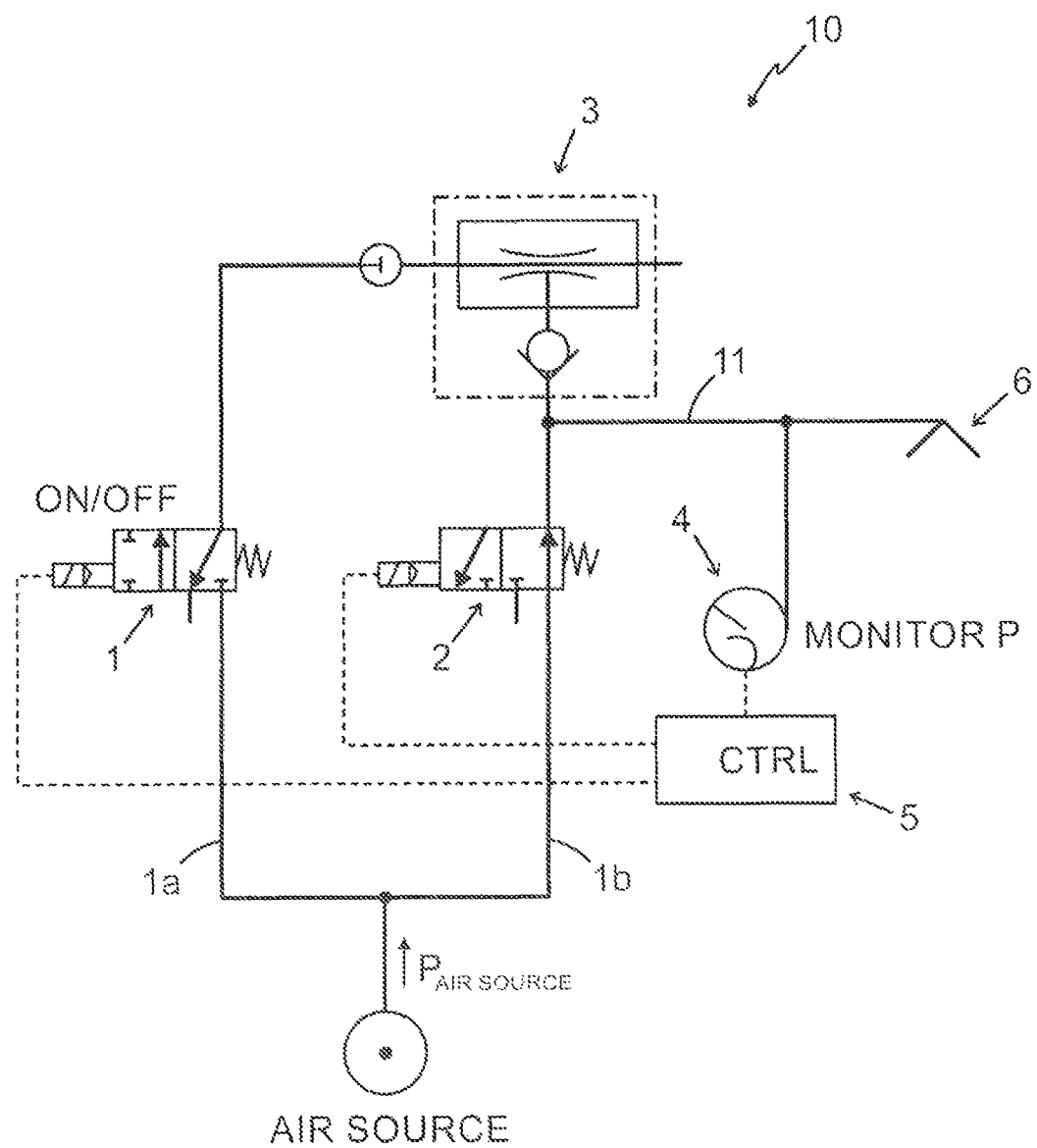

CONTROLLING A VACUUM SYSTEM COMPRISING A VACUUM GENERATOR

This application claims priority of European Application No. 16151553 filed Jan. 15, 2016 which is hereby incorporated herein by reference.

TECHNICAL FIELD

The present disclosure relates to a method of controlling, and a controller for, a vacuum system comprising a vacuum generator driven by compressed air in order to generate a negative pressure applicable for suction cups or similar devices.

BACKGROUND

The present invention relates generally to material handling systems and, more particularly, to controlling a vacuum generator for suction cups of material handling systems that are engaged with the objects and substantially sealed thereto via operation of the vacuum system comprising the vacuum generator and the suction cups. It is known to provide a material handling system that includes suction cups or the like that are adapted to be moved into engagement with an object, such as a substantially flat object or panel or the like, and to lift and move the object to a desired location. The suction cups may be moved into engagement with the object, and the vacuum generator may be actuated to create a vacuum between the object and a suction cup such that the object is retained to the suction cup as it is transported to the desired location.

The vacuum generated at the suction cup(s) is provided by the vacuum generator in the vacuum system, whereby pressurized air is supplied or provided to the vacuum generator.

When the air supply to the vacuum generator is deactivated, such that no vacuum is generated, the vacuum in the vacuum system may dissipate through a vent that connects the vacuum system to an atmosphere outside of the system, and when the vacuum has dissipated in the system and in the cup, to a sufficient amount, the suction cup may be released from the object.

Prior art devices are known from e.g. EP-1064464 where it is disclosed a vacuum ejector pump for generating a negative pressure used for transportation or lifting purposes. And in, U.S. Pat. No. 7,950,422 where it is disclosed an auto-release vacuum device for a material handling system.

Although presently used vacuum systems for transportation have many advantages, the time to vent the system and/or the vacuum cup(s), is in some occasions considered too long.

The object of the present invention is to achieve an improved vacuum system that eliminates, or at least mitigates, the above stated drawbacks, by being more user-friendly to handle, and having shorter deactivation times.

It is known, in order to reduce cycle times in industrial production lines, to provide vacuum generators having arrangements for the active release of objects from the suction cup(s). A known solution is to vent, typically to connect the suction cup(s) or the supply line with atmospheric pressure, for instance via a controlled valve.

Prior art devices are known from e.g. EP-B1-2263011 where it is disclosed a vacuum generator, driven by high-pressure air, and having means arranged for active release of an object that is gripped in a suction cup.

Although presently used systems have many advantages the used devices, the time to vent the suction cup(s), is in some occasions considered too long. There is also a problem that sometimes suction cups stick to a surface because the vacuum system does not allow for atmosphere to enter the system, at least not fast enough.

An object of the present invention is to provide a method, control unit and vacuum system for controlling a vacuum ejector device that eliminates, or at least mitigates, the above stated drawbacks.

SUMMARY

The above-mentioned object is achieved by the present invention according to the aspects and embodiments of the independent claims. Preferred embodiments are set forth in the dependent claims.

According to an aspect, there is provided a method for controlling a vacuum generator in a vacuum system for transportation of objects. The vacuum system comprises a vacuum generator driven by a compressed air flow via a first on/off valve. The vacuum generator via a vacuum chamber being part of the vacuum system is arranged to be brought in flow connection with the vacuum gripper means comprised in the vacuum system, in order to supply vacuum to the vacuum gripper means in result of the compressed air flow. The vacuum system comprises a second valve arranged to supply compressed air into the vacuum system; a pressure sensor for monitoring a system pressure inside the vacuum chamber; and a vacuum system controller. If the on/off valve is not flowing air to the vacuum generator, and the controller indicates a state of no vacuum generation, and if a fluctuation from a pressure-equilibrium to a negative time-derivative of the system-pressure is detected, the second valve is activated, allowing an amount of compressed air to flow into the vacuum-system for compensation to re-establish the pressure-equilibrium.

According to another aspect, there is provided a controller for controlling a vacuum generator in a vacuum system for transportation of objects. The vacuum system comprises a vacuum generator driven by a compressed air flow via a first on/off valve. The vacuum generator via a vacuum chamber being part of the vacuum system is arranged to be brought in flow connection with the vacuum gripper means comprised in the vacuum system, in order to supply vacuum to the vacuum gripper means in result of the compressed air flow, wherein the vacuum system comprises a second valve arranged to supply compressed air into the vacuum system; a pressure sensor for monitoring a system pressure inside the vacuum chamber; and a vacuum system controller. The controller is arranged to communicate with the first on/off valve, the second valve and the pressure sensor and when the on/off valve is not flowing air to the vacuum generator, and the controller indicates a state of no vacuum generation, and if a fluctuation from a pressure-equilibrium to a negative time-derivative of the system-pressure is detected, the controller is arranged to activate the second valve, allowing an amount of compressed air to flow into the vacuum-chamber for compensation to re-establish the pressure-equilibrium.

According to another aspect, there is provided a vacuum system for transportation of objects. The vacuum system comprises a vacuum generator driven by a compressed air flow via a first on/off valve, wherein the vacuum generator via a vacuum chamber being part of the vacuum system is arranged to be brought in flow connection with the vacuum gripper means comprised in the vacuum system, in order to supply vacuum to the vacuum gripper means in result of the compressed air flow, wherein the vacuum system comprises a second valve arranged to supply compressed air into the vacuum system; a pressure sensor for monitoring a system pressure inside the vacuum chamber; and a vacuum system controller. The controller is arranged to communicate with the first on/off valve, the second valve and the pressure sensor and when the on/off valve is not flowing air to the vacuum generator, and the controller indicates a state of no vacuum generation, and if a fluctuation from a pressure-equilibrium to a negative time-derivative of the system-pressure is detected, the controller is arranged to activate the second valve, allowing an amount of compressed air to flow into the vacuum-chamber for compensation to re-establish the pressure-equilibrium.

The invention, according to an object, solves the problem in ejector-driven vacuum systems, where suction cups stick to a surface because the vacuum system does not allow for atmosphere to enter into the system. The controller detects such an event autonomously, and in case of it being involuntary, injects compressed air into the vacuum system to compensate and maintain the equilibrium with atmosphere in the system.

The invention, according to the various aspects and embodiments, solves the problem, which is frequently encountered in, but not limited to, applications with ergonomic lifting devices having a gripper with suction cups and equipped with energy saving that has non-return-valves to stop atmosphere from entering the vacuum system when the vacuum ejector is turned off, or is idle mode. This is due to when the gripper is to be positioned on the object that is the target, it may grip to a surface, being the target or another surface, even before the vacuum ejector is tuned on, or is in operational mode.

Yet another object of the invention is to provide a vacuum generator comprising a release function which can be adapted to varying demands for air in order to interrupt the vacuum in a vacuum gripper means.

SHORT DESCRIPTION OF THE DRAWINGS

The invention is explained more in detail below with reference made to the accompanying drawing, wherein embodiments of the invention are illustrated schematically:

FIG. 1 is a schematic view of implementation of a control unit for a vacuum generator in a vacuum system 10 comprising a vacuum generator.

DETAILED DESCRIPTION OF THE INVENTION

For a general description of implementation of the invention in a vacuum system 10 for transportation of objects, reference is initially made to FIG. 1.

An embodiment of the invention will now be described with reference to FIG. 1, wherein details of the embodiment that correspond to the above description of the vacuum system will be indicated by the corresponding reference numbers that were previously used in FIG. 1.

The vacuum system 10 comprises a vacuum generator 3 driven by a compressed air flow via a first on/off valve 1, or other means for controlling the compressed air flow, wherein the vacuum generator 3 via a vacuum chamber 11 being part of the vacuum system 10 is arranged to be brought in flow connection with one or more vacuum grippers 6 comprised in the vacuum system 10, in order to supply vacuum to the vacuum gripper 6 in result of the compressed air flow to the vacuum generator 3. The vacuum system 10 comprises a second valve 2 arranged to supply compressed air into the vacuum system 10. In FIG. 1, the line $P_{air\ source}$ represents the direction of compressed air flow from a compressed air supply source AIR SOURCE via the first valve 1 to the vacuum generator 3. The air supply source AIR SOURCE is typically the same both for supplying compressed air to the vacuum generator 3, in other words to the first valve 1, as well as to the second valve 2 for allowing compressed air into the system 10, typically inside a vacuum chamber 11, but via different supply connections 1a and 1b as illustrated in the FIGURE.

A pressure sensor 4 is provided inside, or at, or centrally located to, the vacuum chamber 11 for monitoring a system pressure P. The vacuum system 10 further comprises a vacuum system controller 5, also referred to as a "controller". As an example, but without any limitation thereto, the valves 1 and 2 can either be directly operated solenoid-valves, or operating as pilot-valves to actuate piloted valves to supply the vacuum generator and/or vacuum system 10 with air.

Typically, the controller 5 is arranged to communicate with the first on/off valve 1, the second valve 2 and the pressure sensor 4. The vacuum system 10, and/or the vacuum generator 3 can be integrated with the controller 5 and the control-valves 1 and 2, as well as the system-pressure sensor 4 (sometimes also referred to as a pressure gauge), of which the latter can be used to monitor the system pressure P in the vacuum system, in particular in the vacuum chamber 11.

The controller 5 may be defined and/or operated by components including a specific control-algorithm implemented in an existing controller used for controlling the vacuum generator 3, but also other parts of the vacuum system.

When the on/off valve 1 is not flowing air to the vacuum generator 3, and the controller 5 indicates a state of no vacuum generation, for instance by a signal from the first valve 1, or the vacuum generator per se, and if a fluctuation from a pressure-equilibrium to a negative time-derivative of the system-pressure P is detected, for example if vacuum is detected at the vacuum grippers 6 or inside the vacuum chamber 11, the controller 5 is arranged to activate the second valve 2, allowing an amount of compressed air to flow into the vacuum-chamber 11 for compensation to re-establish the pressure-equilibrium, such that there is no negative pressure but atmospheric pressure as intended.

In this way, the invention according to an aspect, aims to provide a vacuum gripper 6 with immediate supply of air for an active release of an object gripped by the vacuum gripper 6. Herein the term "vacuum gripper" also includes a plurality of vacuum grippers and vacuum gripper means.

Other advantages compared to prior art is no waste and/or easy to use. Since typically, but without limitation thereto, only one system-pressure sensor 4 is used, there is no need for additional sensors and external functions. No sensors are needed on each vacuum gripper 6, for example suction cup, but only one centrally located, or centralized sensor as described above.

According to an embodiment, the amount of compressed air that is allowed into the vacuum chamber 11 is determined based on duration of a previous release-cycle's air volume that was allowed into the vacuum chamber 11. The controller, as well as the inventive control method, according to various embodiments adapts the amount of compressed air allowed into the vacuum-chamber 11, or vacuum system 10, based on previous cycles of operation. The controller 5 or the inventive method requires no manual intervention or setting in order to be used. This is an advantage compared to prior art device often requiring intensive manual labor by the operator, or the operator setting control parameters having unnecessary long time periods to ensure proper venting to atmosphere. There is also no need for manual setting and calibration as the success of each cycle is evaluated and used automatically to improve performance.

An advantage with this embodiment is that, since the method and controller 5 is continuously adapting, and is only activated for as often and as long as necessary dictated by the actual need of the application.

But, according to an alternative embodiment, or in addition, the controller 5 can be adapted so that the operator may also manually adjust the control parameters to better fit individual needs of an application or use.

It may also be possible to disable the controller 5, or the inventive control method, either exclusively, or dependently based on the incoming signal for vacuum generation.

System-pressure P can be monitored continuously or periodically and fluctuation can be detected autonomously.

According to an embodiment, each previous release-cycle is analyzed and it's parameters re-evaluated autonomously.

The vacuum generator 3, in FIG. 1 schematically illustrated, is typically realized as an ejector. The vacuum gripper means 6 may be realized as a suction cup, or as a set of suction cups that are commonly supplied from the vacuum generator 3.

It shall be noted that FIG. 1 merely depicts the general layout of a vacuum system for the purpose of illustrating the invention, and that a vacuum system in practice can comprise additional valves, sensors and flow connections in order to adapt the vacuum system to a desired functionality, as would be known to a person skilled in the art.

The invention is defined in the accompanying claims, encompassing the above and other modifications of the invention which may be appreciated by the skilled person from the teachings provided above.

As an example, the components that define and/or operate the controller 5 in this example may be implemented by special-purpose software (or firmware) run on one or more general-purpose or special-purpose computing devices. Such a computing device may include one or more processing units, e.g. a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). In this context, it is to be understood that each "component" of the controller 5 refers to a conceptual equivalent of an algorithm; there is not always a one-to-one correspondence between components and particular pieces of hardware or software routines. One piece of hardware sometimes comprises different components. For example, the processing unit may serve as one component when executing one instruction, but serve as another component when executing another instruction. In addition, one component may be implemented by one instruction in some cases, but by a plurality of instructions in some other cases. The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc. One or more I/O devices may be connected to the computing device, via a communication interface, including e.g. a keyboard, a mouse, a touch screen, a display, a printer, a disk drive, etc. The special-purpose software may be provided to the computing device on any suitable computer-readable medium, including a record medium, a read-only memory, or an electrical carrier signal.

Typically, all the functions to operate the controller and method are included in one compact package.

The invention claimed is:

1. A method for controlling a vacuum generator in a vacuum system for transportation of objects, which vacuum system comprises a vacuum generator driven by a compressed air flow via a first on/off valve, wherein the vacuum generator via a vacuum chamber being part of the vacuum system is arranged to be brought in flow connection with a vacuum gripper comprised in the vacuum system, in order to supply vacuum to the vacuum gripper in result of the compressed air flow, wherein the vacuum system comprises a second valve arranged to supply compressed air into the vacuum system; a pressure sensor for monitoring a system-pressure inside the vacuum chamber; and a vacuum system controller, wherein when the on/off valve is not flowing air to the vacuum generator, and the controller indicates a state of no vacuum generation, and if a fluctuation from a pressure-equilibrium to a negative time-derivative of the system-pressure is detected, the second valve is activated, allowing an amount of compressed air to flow into the vacuum-system for compensation to re-establish the pressure-equilibrium.

2. The method according to claim 1, wherein system-pressure is monitored continuously and fluctuation is detected autonomously.

3. The method according to claim 1, wherein system-pressure is monitored periodically and fluctuation is detected autonomously.

4. The method according to claim 1, wherein the amount of compressed air that is allowed into the vacuum chamber is determined based on a duration of a previous release-cycle's air volume that was allowed into the vacuum chamber.

5. The method according to claim 1, wherein each previous release-cycle is analyzed and it's parameters re-evaluated autonomously.

6. The method according to claim 1, wherein parameters are also adjusted manually by an operator.

7. The method according to claim 1, wherein parameters are only adjusted manually by an operator.

8. A controller for controlling a vacuum generator in a vacuum system for transportation of objects, which vacuum system comprises a vacuum generator driven by a compressed air flow via a first on/off valve, wherein the vacuum generator via a vacuum chamber being part of the vacuum system is arranged to be brought in flow connection with a vacuum gripper comprised in the vacuum system, in order to supply vacuum to the vacuum gripper in result of the compressed air flow, wherein the vacuum system comprises a second valve arranged to supply compressed air into the vacuum system; a pressure sensor for monitoring a system-pressure inside the vacuum chamber; and the controller, wherein the controller is arranged to communicate with the first on/off valve, the second valve and the pressure sensor and when the on/off valve is not flowing air to the vacuum generator, and the controller indicates a state of no vacuum generation, and if a fluctuation from a pressure-equilibrium to a negative time-derivative of the system-pressure is detected, the controller is arranged to activate the second valve, allowing an amount of compressed air to flow into the vacuum-chamber for compensation to re-establish the pressure-equilibrium.

9. The controller according to claim 8, wherein the controller is arranged to monitor system-pressure continuously and to detect fluctuation autonomously.

10. The controller according to claim 8, wherein the controller is arranged to monitor system-pressure periodically and to detect fluctuation autonomously.

11. The controller according to claim 8, wherein the controller is arranged to determine the amount of compressed air that is allowed into the vacuum chamber based on duration of a previous release-cycle's air volume that was allowed into the vacuum chamber.

12. The controller according to claim 8, wherein the controller is arranged to analyze each previous release-cycle and re-evaluate its parameters autonomously.

13. A vacuum system for transportation of objects, which vacuum system comprises a vacuum generator driven by a compressed air flow via a first on/off valve, wherein the vacuum generator via a vacuum chamber being part of the vacuum system is arranged to be brought in flow connection with a vacuum gripper comprised in the vacuum system, in order to supply vacuum to the vacuum gripper in result of the compressed air flow, wherein the vacuum system comprises a second valve arranged to supply compressed air into the vacuum system; a pressure sensor for monitoring a system-pressure inside the vacuum chamber; and a vacuum system controller, wherein the controller is arranged to communicate with the first on/off valve, the second valve and the pressure sensor and when the on/off valve is not flowing air to the vacuum generator, and the controller indicates a state of no vacuum generation, and if a fluctuation from a pressure-equilibrium to a negative time-derivative of the system-pressure is detected, the controller is arranged to activate the second valve, allowing an amount of compressed air to flow into the vacuum-chamber for compensation to re-establish the pressure-equilibrium.

14. The vacuum system according to claim 13, wherein the controller is arranged to monitor system-pressure continuously and to detect fluctuation autonomously.

15. The vacuum system according to claim 13, wherein the controller is arranged to monitor system-pressure periodically and to detect fluctuation autonomously.

16. The vacuum system according to claim 13, wherein the controller is arranged to determine the amount of compressed air that is allowed into the vacuum chamber based on duration of a previous release-cycle's air volume that was allowed into the vacuum chamber.

* * * * *